United States Patent [19]
Illig

[11] 4,017,293
[45] Apr. 12, 1977

[54] HEAT TREATING AND SAGGING LENS BLANKS

[75] Inventor: Edwin J. Illig, Corning, N.Y.

[73] Assignee: Corning Glass Works, Corning, N.Y.

[22] Filed: May 27, 1976

[21] Appl. No.: 690,623

[52] U.S. Cl. .................................. 65/107; 65/111; 65/DIG. 2

[51] Int. Cl.² .................. C03B 23/02; C03B 32/00

[58] Field of Search ............. 65/41, 111, 107, 117, 65/DIG. 2

[56] References Cited

UNITED STATES PATENTS

| | | | |
|---|---|---|---|
| 2,377,946 | 6/1945 | Leary | 65/107 X |
| 2,821,812 | 2/1958 | Vermas et al. | 65/111 X |

FOREIGN PATENTS OR APPLICATIONS 111,753  10/1940  Australia .......................... 65/41

Primary Examiner—Arthur D. Kellogg
Attorney, Agent, or Firm—Charles W. Gregg; Burton R. Turner; Clarence R. Patty, Jr.

[57] ABSTRACT

A method of heat treating a plurality of geometrically congruent and flat lens blanks made from a phototropic glass, such heat treating being performed for development of the phototropic properties thereof. A plurality of lens blanks are formed into a stack by alternately positioning and clamping similar areas between the flat surfaces of two flat, annular, spacer members. The stack is then rotated about the longitudinal axis oriented in a substantially horizontal position while evenly heating the lens blanks to the phototropic development temperature of the glass. The stack of blanks is then vertically positioned while continuing the heating thereof and part of each of the blanks sags into the hollow of the spacer member therebelow to form such part of each blank into a curved configuration for an eyeglass lens.

6 Claims, 4 Drawing Figures

HEAT TREATING AND SAGGING LENS BLANKS

BACKGROUND OF THE INVENTION

It is required to, or at least expedient to, subject lens blanks made from phototropic glass compositions to a heat treatment, after initial forming thereof, to develop the phototropic characteristics or properties of the glass compositions from which the lens blanks are formed. Such a heat treatment is sometimes performed at a temperature above the softening point temperature of the glass of the lens blanks and, therefore, the lens blanks can sag or otherwise become misshaped if not suitably supported during said heat treatment thereof. For example, it may be required, or at least expedient to, subject lens blanks made from glass compositions such as disclosed in U.S. Pat. Nos. 3,197,296; 3,208,860, and 3,325,299, issued July 27, 1965, Sept. 28, 1965, and June 13, 1967, respectively, to heat treatments, at a temperature above the softening point temperature of the glass of the lens blanks, for the purpose of developing or inducing the phototropic characteristics or properties of said compositions and lens blanks made from such compositions. In such event said lens blanks should be suitably supported to prevent sagging or deformation thereof. The aforesaid supporting of said lens blanks has heretofore been performed by disposing and clamping the flat surfaces of each lens blank between the flat surfaces of a pair of flat disks of a suitable material and then subjecting such blank to the necessary heat treatment. This however imparts to said surfaces of the treated lens blank any roughness of said surfaces of said disks regardless of the minuteness of such roughness, and the treated lens blank, or an eyeglass lens formed, therefrom must, therefore, be ground and polished to remove said roughness imparted thereto during the heat treatment thereof.

It is economically desirable that the making of non-prescription sunglass lenses be performed at as low of a cost as possible and, to such end, it has been suggested that lens blanks can be sagged into suitably shaped mold carriers to form the contour or curvature desired for the sunglass lenses since such lenses are not prescription lenses requiring precise shaping by precise grinding thereof. It has then been further suggested that the lens blanks could be sagged into suitably shaped mold cavities to attain the desired eyeglass lens shapes during the aforesaid heat treatment and another economic advantage thereby attained. However, the surfaces of said mold cavities impart roughness to the convex surfaces of the shaped lenses in a manner similar to that in which roughness is imparted to the lens blanks by the surfaces of said disks during said heat treatment of such blanks and, therefore, said convex surfaces of the lens shaped by sagging of lens blanks into mold cavities would also have to be ground and polished to remove said roughness imparted thereto.

In view of the above it is an object of the present invention to provide a method of heat treating a plurality of lens blanks at a temperature above the softening point temperature of the glass of such blanks and without distortion of such lens blanks and, while such plurality of lens blanks are continued to be heated, to sag part of each of the blanks into a shape having a curvature desired for an eyeglass lens.

It is another object of the present invention to economically heat treat and sag lens blanks, made from a phototropic glass composition having a softening point temperature below the temperature required or desired for heat treatment of such blanks to develop the phototropic characteristics or properties of the lens blanks, into shapes having curved contours suitable for eyeglass lenses, the heat treatment and sagging of the lens blanks being performed on a plurality of said blanks at the same time.

Other objects and characteristic features will become apparent as the description proceeds.

SUMMARY OF THE INVENTION

The invention is believed to be adequately summarized in the foregoing abstract of the disclosure and, therefore, for the sake of brevity and to prevent repetition or redundancy to the extent possible, no further summary of the invention will be given nor is any believed necessary.

BRIEF DESCRIPTION OF THE DRAWINGS

In the drawings.

Similar reference characters refer to similar parts in each of the Figs. of the drawings.

PREFERRED EMBODIMENTS OF THE INVENTION

Figure 1:
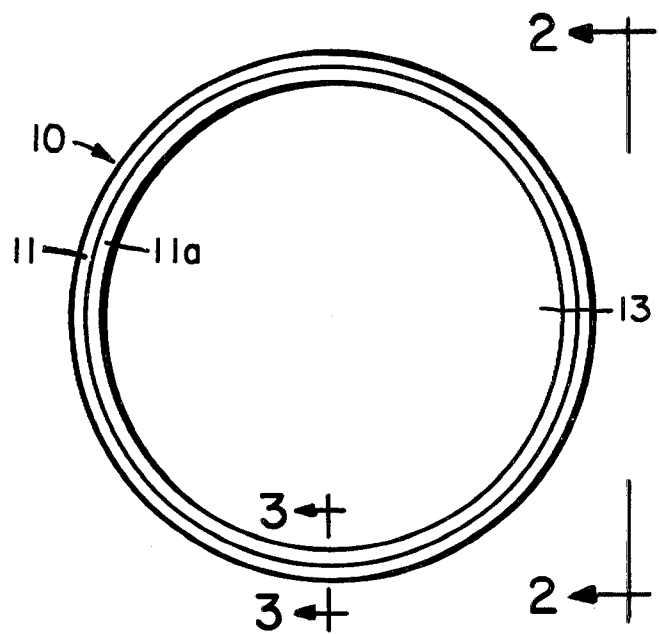
FIG. 1 is an elevational view on an enlarged scale of one end of a spacer or spacer member which may be used in practicing the invention disclosed.
Figure 2:
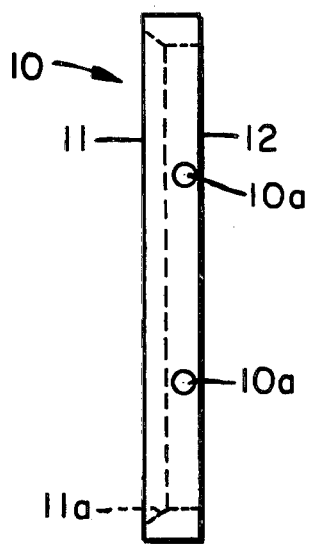
FIG. 2 is a side view of the spacer or spacer member of FIG. 1, such view being taken along line 2—2 of FIG. 1.
Figure 3:
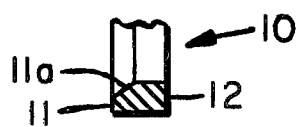
FIG. 3 is a cross-sectional view of the spacer or spacer member of FIGS. 1 and 2, such view being taken along line 3—3 of FIG. 1.

Referring to FIGS. 1, 2 and 3 of the drawings in detail, there is shown, on an enlarged scale as previously mentioned, a circular spacer or spacer member 10 having annular flat surfaces 11 and 12 defining a hollow 13 extending from one of such flat surfaces through the other of such flat surfaces. Hollow 13 of spacer or spacer member 10 preferably slopes or tapers inwardly or toward the center thereof at least adjacent one of the flat surfaces of the spacer or spacer member 10. In FIGS. 1 and 3, such slope or taper is shown as being adjacent flat surface 11 of the spacer or spacer member and is designated 11a. Each of the spacers or spacer members such as 10 preferably has a plurality of holes such as 10a (FIG. 2) evenly spaced apart about the perimeter of each respective spacer or spacer member and extending through each such member from the outer surface of said perimeter to the inner surface defining the limits of the hollow 13 in each member such as 10. The holes such as 10a are provided for the purpose of more rapid and even heating of lens blanks and release of heated air during the previously mentioned heat treatment and sagging thereof, This is also further mentioned hereinafter.

Figure 4:
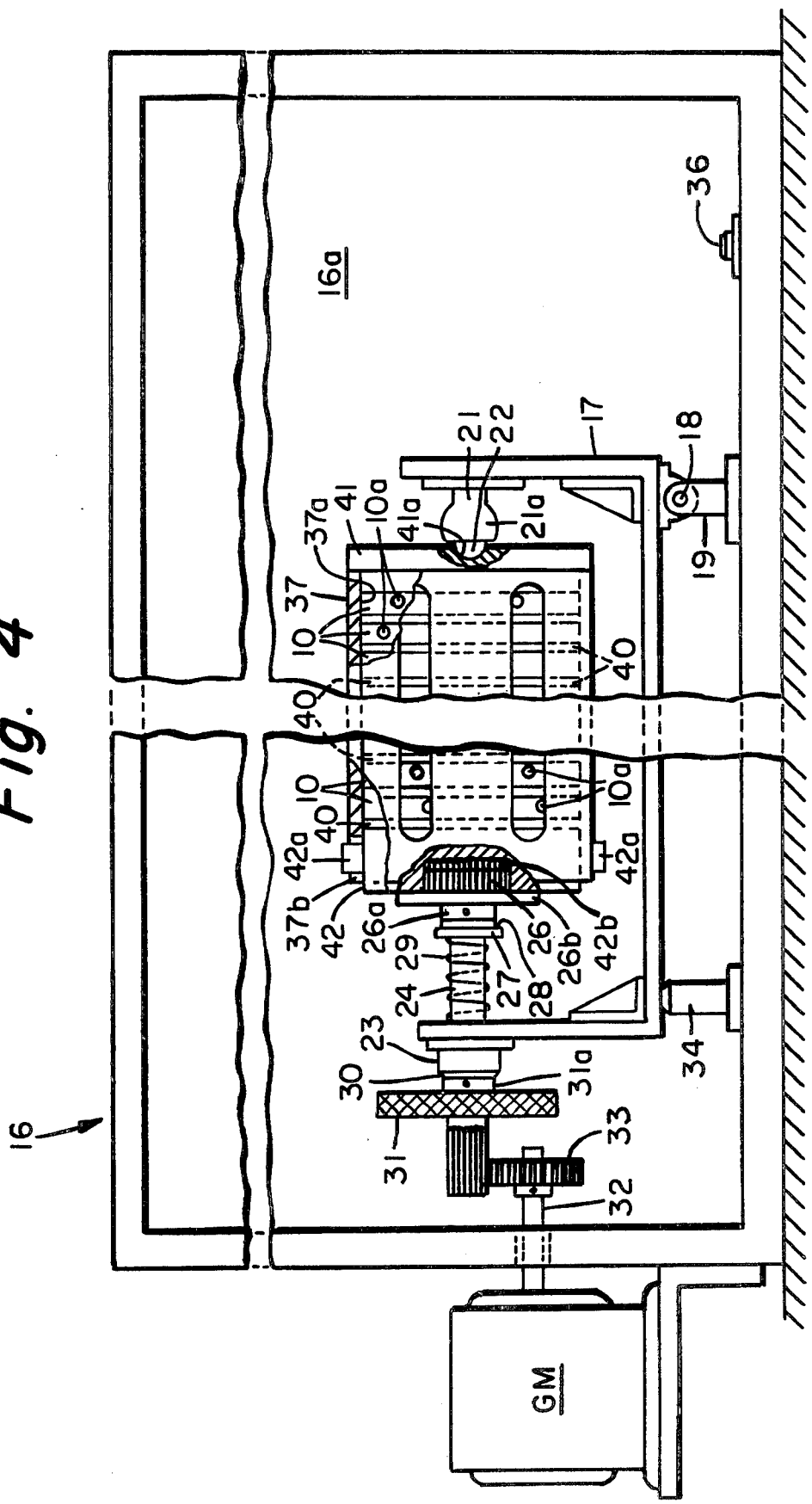
FIG. 4 is an elevational view of one form of apparatus which may be used in practicing the invention disclosed.

Referring now to FIG. 4 of the drawings, there is shown a furnace or oven 16 made of a suitable thermal insulation material and embodying a cavity or chamber 16a which may be heated to any desired temperature by, for example, suitable electrical resistance coils in the manner well known in the art but which are omitted from the drawing for purpose of simplification thereof.

As shown, furnace or oven 16 has an open side or front which may be closed by a door also of a suitable thermal insulation material but which is also omitted from the drawing for purpose of simplification. This is also well known in the art.

There is provided in chamber 16a of furnace or oven 16 a generally U-shaped support bracket 17 which is hinged adjacent the lower right hand end thereof (viewing FIG. 4) to a shaft 18 which is free to rotate in suitable support brackets such as 19 secured to the bottom wall of furnace or oven 16. Bracket 17 is preferably keyed to shaft 18 for rotation therewith and the rear end of such shaft preferably extends through a suitable hole in the rear wall of furnace or oven 16 and is provided with a suitable crank, lever or knob for manual rotation of such shaft and, thereby, of bracket 17 keyed thereto. However such arrangement is omitted from the drawings for purpose of simplification thereof. The purpose of the described arrangement for rotation of shaft 18 will be discussed hereinafter.

There is secured to the left hand surface of the right hand upright (viewing FIG. 4) of support bracket 17, a bearing member 21 including a cup 21a holding a freely movable ball bearing 22 as is well known in the art. A sleeve bearing 23 is secured to the left hand surface of the left hand upright (viewing FIG. 4) of support bracket 17 and a shaft or axle 24 rotatably and slidably extends through sleeve bearing 23 and a suitable hole provided in said left hand upright. A spur gear 26 is mounted on the right hand end of shaft or axle 24 and includes a hub portion 26a by which gear 26 is keyed to shaft 24 for rotation therewith, and a disk-like pressure plate portion 26b for a purpose to be hereinafter discussed. A collar 27 fits snugly but slidably movable on shaft 24 and a washer 28 is disposed on such shaft between the right and left hand faces, respectively, of collar 27 and hub portion 26a of spur gear 26. A compression spring 29 surrounds shaft 24 with one of its ends bearing against collar 27 and the other of its ends bearing against the right hand surface of the left hand upright of bracket 17.

A knurled wheel or knob 31 is mounted on shaft 24 and includes a hub portion 31a by which such wheel is secured to said shaft. A washer 30 is disposed on shaft 24 between the right and left hand faces, respectively, of hub portion 31a of wheel 31 and sleeve bearing 23. Shaft 24 is splined along a portion of its length adjacent the left hand end thereof and the output shaft 32 of a suitable electric gear motor GM extends through a suitable hole provided in the left hand wall of furnace or oven 16 and, such shaft has keyed thereto, adjacent the right hand end thereof, a spur gear 33 whose teeth mesh with the splined end of shaft 24 when bracket 17 is in its horizontal position shown. Gear motor GM is a variable speed motor whose speed, that is the speed of output shaft 32, may be varied by a suitable potentiometer not shown but which is connected into an energizing circuit, also not shown, for motor GM. The purpose of the above mentioned knurled wheel or knob 31 will be discussed later in the description.

It should be pointed out that a support pedestal 34 is mounted on the inner surface of the bottom wall of furnace or oven 16 and is contacted by the lower surface of bracket 17 when such bracket is in its horizontal position shown. Support pedestal 34 is of a height such as to permit the teeth of spur gear 33 to mesh with the splined end of shaft 24 without binding therebetween. A relatively short support pedestal 36 is also mounted on the inner surface of the bottom wall of furnace or oven 16 and, when bracket 17 is raised to a vertical position as hereinafter discussed, the right hand surface of the right hand upright of bracket 17 contacts said pedestal to hold such bracket in a relatively precise vertical position as also hereinafter discussed.

In practicing the invention disclosed there is provided a tube or tubular member 37 (FIG. 4) whose hollow 37a has a cross-sectional shape complemental or corresponding to the outer periphery of each of a plurality of glass lens blanks to be heat treated and sagged to a desired curvature for eyeglass lenses. For purposes of this description the outer peripheries of the lens blanks discussed will be assumed to be circular and therefor tube or tubular member 37 and the hollow 37a therein will also be assumed to be circular. Said lens blanks are each designated 40 in FIG. 4 and they are disposed in said hollow 37a alternately with a plurality of the previously discussed spacers or spacer members such as 10 shown in FIGS. 1 and 2 so that each such lens blank rests on the flat surface 11 of one of said spacers or spacer members so that the bevel or taper 11a of each spacer member is below or faces the bottom of a lens blank when bracket 17 is raised to its vertical position previously mentioned and hereinafter further discussed.

After a number of said lens blanks, such as 40, and spacers or spacer members, such as 10, sufficient to substantially fill the hollow 37a of tube or tubular member 37 are disposed therein, a plug member 41, also having a perimetric configuration corresponding to that of said hollow 37a is inserted into one end of said hollow and secured therein in any convenient manner so that it is contacted by the flat surface 12 of the end one of said spacers or spacer members such as 10. Alternatively, plug member 41 may be an integral and permanent end member of tube or tubular member 37. Plug member 41 embodies in the center of the outer wall thereof a curved recess 41a which is complemental to or cooperative with the aforesaid ball bearing 22 to provide a rotative bearing arrangement as illustrated in FIG. 4. Another plug member 42 is inserted into the second end of tube or tubular member 37 and projections such as 42a on such member extend into slots such as 37b provided in said second end of the tube or tubular member and extending through the peripheral wall thereof. Plug member 42 embodies in the center of the outer wall thereof a cavity or opening 42b which is provided with teeth that mesh with the teeth of aforesaid spur gear 26 when such gear is inserted into cavity or opening 42b. It will, therefore, be readily apparent that any rotation imparted to spur gear 26 through rotation of shaft 24 will be imparted to plug member 42 and thence, by means of said projections such as 42a on such member, to tube or tubular member 37.

It is believed expedient to point out at this time that tube or tubular member 37 is preferably provided with a plurality of longitudinal openings or slots such as 37c which extend through the wall of such tube or member and are evenly spaced apart about the periphery of the tube or member. Such slots are provided for the purpose of providing, in conjunction with the holes such as 10a in the spacer or spacer members such as 10, more rapid and even heat distribution for the aforesaid heat treatment and sagging of the lens blanks, and for the purpose of release of heated air to prevent the pressure thereof from distorting the blanks by exerting force against the faces or flat surfaces thereof. For the same purposes, end plugs or plug members 41 and 42 can each be provided with a plurality of holes extending therethrough from one flat surface thereof to the other if considered expedient to do so. If such holes are provided in plug member 42 they must, of course, be adjacent the outer periphery thereof so as not to be completely covered by disk-like portion 26b of spur gear 26. Alternatively, portion 26b could have a stellate or similar shape, rather than be disk-shaped as shown, and then heat could pass between the rays or radials of such portion and thence through holes or parts of holes which are not outside the reach of the rays or radials, that is, which are not, as mentioned above in connection with a disk-like portion 26b, necessarily adjacent the outer periphery of plug member 42.

Following the above discussed alternate stacking of said lens blanks such as 40 and said spacers or spacer members, such as 10, and the insertion of plug members 41 and 42 in the ends of tube or tubular member 37, such member is disposed in cavity 16a of oven or furnace 16 between ball bearing 22 and spur gear 26 as shown in FIG. 4. During such placing of the tube or tubular member, wheel or knob 31 is manually grasped and moved to the left thereby moving shaft 24 to the left and further compressing spring 29. At such time the splines of the left hand end of shaft 24 slide to the left in the teeth of spur gear 33 as will be readily apparent. Spur gear 26 is then inserted into cavity 42b of plug member 42 by permitting knob or wheel 31 to be moved to the right under the force of spring 29, knob or wheel 31 being rotated slightly, if necessary, so that the teeth of the spur gear can mesh with the aforesaid teeth provided in said cavity 42b. Wheel or knob 31 is then permitted to be moved to the right by spring 29 until the teeth of spur gear 26 are fully inserted between the teeth provided in cavity 42b and pressure plate portion 26b of spur gear 26 contacts and is pressed firmly against the left hand surface of plug member 42 by spring 29 to firmly clamp the lens blanks, such as 40, between the aforesaid flat surfaces 11 and 12 of the spacers or spacer members, such as 10, disposed in tube or tubular member 37, plug member 41 acting as a back-up member for the clamping force at such time. The claping force so applied is, of course, dependent on the strength or force of spring 29 as is readily apparent.

Following the disposition or placing in cavity 16a of oven or furnace 16 of tube or tubular member 37, and its contained and clamped stacked plurality of lens blanks and spacer and spacer members as discussed above, the oven or furnace cavity 16a is closed by the previously mentioned door to substantially thermally seal the oven or furnace and the heating means therefor is energized to heat the oven or furnace while gear motor GM is also energized to impart rotation to its output shaft 32 and thence to spur gear 33, shaft 24, spur gear 26, plug member 42 and thence to tube or tubular member 37 and the stack of lens blanks and spacer or spacer members contained and clamped therein.

As taught by the previously mentioned U.S. Pat. Nos. 3,197,296; 3,208,860; and 3,325,299, and as previously set forth, it is expedient to subject lens blanks of a phototropic glass composition to a heat treatment above the softening point temperature of such a glass for the purpose of development of or inducing the phototropic characteristics or properties of the glass because, at such a temperature, a shorter time cycle for such development or inducing may be used. However, at such a temperature, that is, at a temperature above the softening point temperature of the glass of the lens blanks, the blanks tend to sag or otherwise deform out of shape. By using the method herein disclosed, the blanks retain their shape during heat treatment above the softening point temperature thereof because the clamping and the rotation of the blanks in a horizontal orientation of a stack thereof during such treatment counteracts any deformation, such as sagging, that tends to occur in the blanks at such time.

Following a heat treatment cycle of the lens blanks as discussed above, gear motor GM is deenergized and the previously mentioned crank, lever or knob, keyed to axle or shaft 18 at the rear of furnace 16, is rotated to turn and raise bracket 17 and tube or tubular member 37 to a precisely vertical position, the right hand surface of the right hand upright of such bracket 17 coming to rest on the upper end of bracket 36 at such time. It will be readily apparent that cavity 16a in oven or furnace 16 must have a height sufficient to permit the turning and raising of bracket 17 and its associated apparatus to a vertical position as set forth above.

The above mentioned rotation of tube or tubular member 37 and its contained lens blanks is terminated when gear motor GM is deenergized as mentioned above or when the splines of the left hand end of shaft 24 are moved out of engagement with the teeth of spur gear 33 by the raising of bracket 17, rotation of the lens blanks being unnecessary for the step of sagging the lens blanks to the curvature desired for eyeglass lenses. The temperature of cavity 16a is maintained or it may be somewhat increased or decreased as found expedient for the blank sagging step. However, such temperature must, of course, be above the softening point temperature of the glass of the lens blanks. During the blank sagging step each such blank sags into the hollow 13 of the respective spacer or spacer member such as 10 therebelow. The clamping of the lens blanks adjacent the outer rim thereof and between the flat surfaces such as 11 and 12 of the respective spacer or spacer members below and above, respectively, of each lens blank, permits the lens blanks to sag without losing their circular shape.

The optimum time-temperature cycles for sagging of the lens blanks depends, of course, on the composition of the glass of such blanks and the degree of curvature desired in the eyeglass lenses for which the sagged lens blanks are intended to be used. Such cycles can be determined by a minimum amount of experimentation and, once established, are of course repetitive for each plurality of lens blanks made from a selected glass composition and to be sagged to have a selected curvature. After the lens blanks are selectively sagged, the previously mentioned door, closing cavity 16a of oven or furnace 16, is opened and knurled knob or wheel 31 is manually pulled against the force of spring 29 (using suitable hand protecting gloves) and spur gear 26 is pulled out of cavity 42b of end plug 42. Tubular member or tube 37 is then removed from oven cavity 16a and bracket 17 is returned to its horizontal position shown in FIG. 4 if not so returned prior to removal of tube or tubular member 37 from the oven cavity. Oven 16, and bracket 17 and its associated apparatus are now in condition to receive another tube or tubular member such as 37 and stack of lens blanks and spacers contained therein for heat treatment and sagging of the lens blanks. The sagged lens blanks, following removal from the oven cavity, are permitted to cool for removal thereof from tube or tubular member 37.

It is pointed out that oven or furnace 16 can be made large enough to accommodate, at the same time, a plurality of tubes or tubular members such as 37 and contained lens blanks and spacers or spacer members as is readily apparent. Furthermore, many apparatus arrangements other than a bracket such as 17 and its associated apparatus such as shown in FIG. 4 could be used for supporting tubes or tubular members such as 37 for heat treatment and sagging of lens blanks, the type of apparatus illustrated in FIG. 4 being merely an example of a suitable apparatus arrangement.

In addition, it is pointed out that the lens blanks need not necessarily be circular but can be oval or elliptical, or octagonal etc. of eyeglass lenses of such shapes are desired. In such case, a tube or tubular member such as 37 would have a correspondingly shaped hollow, that is, a hollow having a cross-sectional shape complemental to the lens blanks for holding thereof, and the spacers or spacer members would be similarly shaped as would the plug members to be inserted into the ends of the hollow of the tube or tubular member.

Although there is herein shown and described in detail only one example of the practice of the inventive method disclosed, it is to be understood that such is not to be considered in any way limiting but that various changes and modifications can be made within the purview of the appended claims without departing from the spirit and scope thereof.

I claim:

1. A method of heat treating a plurality of flat geometrically congruent glass lens blanks made from a phototropic glass composition which requires, or it is expedient to subject to, for development of the phototropic properties thereof, a heat treatment at a temperature above the softening point temperature of such glass for a predetermined period of time, such method comprising the steps of:
   A. forming a stack by alternately positioning similar areas of the flat surfaces of each of said lens blanks, adjacent the perimeters thereof, between the flat surfaces of two flat spacer members having hollows extending from one flat surface through the other flat surface thereof, such hollows having perimetric configurations corresponding to perimetric configurations desired for eyeglass lenses to be subsequently made from said lens blanks;
   B. disposing said stack in a tube whose hollow has a cross-sectional shape complemental to the outer peripheries of said lens blanks and supplying force to the ends of said stack to clamp the lens blanks;
   C. rotating said tube and said lens blanks about the longitudinal axis of such tube while horizontally oriented and while evenly heating such lens blanks to said development temperature for said period of time; and
   D. terminating said heating and permitting the glass of said lens blanks to become set up.

2. The method in accordance with claim 1 and, while continuing said heating, performing the further step of vertically positioning said tube to permit part of each said lens blanks to sag into the hollow of the spacer member therebelow to form such part of each blank into a configuration having a curvature desired for one of said eyeglass lenses.

3. The method in accordance with claim 2 and in which the hollows of said spacer members slope towards the centers thereof at least adjacent one of said flat surfaces of each of such spacers.

4. A method of development of the phototropic properties of a plurality of geometrically congruent and flat phototropic glass lens blanks which it is expedient to subject to, or which require a heat treatment for a predetermined period of time at a temperature above the softening point temperature of the glass of said lens blanks for development of said properties, and then sagging said lens blanks to a desired curvature for eyeglass lenses, such method comprising the steps of:
   A. providing a tubular member the cross-sections of the hollow of which, taken normal to the center axis of such member, are geometrically congruent to the flat surfaces of each of said lens blanks, and a plurality of flat hollow spacer members each having an outer perimeter geometrically congruent with the outer perimeter of each of said lens blanks and an inner surface corresponding to the perimetric shape desired for said eyeglass lenses;
   B. alternately positioning and clamping said spacer members and said lens blanks in said tubular member with one of said flat surfaces of each of such lens blanks forcefully abutting one of the flat surfaces of an adjacent one of such spacer members;
   C. rotating said tubular member about its said center axis while horizontally oriented and while evenly heating such member and said lens blanks to said phototropic development temperature for said predetermined period of time;
   D. thereafter vertically positioning said tubular member while continuing said heating thereof to cause part of each of said lens blanks to sag into said hollow of the respectively adjacent one of said spacer members to form such part of each of such lens blanks into said desired curvature for one of lenses; and
   E. terminating the heating of said lens blanks to permit the glass thereof to cool and become set up with said desired curvature formed therein.

5. The method in accordance with claim 4 and in which said tubular member and lens blanks are disposed in a furnace for said heating thereof.

6. The method in accordance with claim 4 and in which the hollow in each said spacer member tapers inwardly toward the center thereof at least adjacent one of the flat surfaces of each such member.

* * * * *